United States Patent
Kim et al.

(10) Patent No.: US 10,318,174 B2
(45) Date of Patent: Jun. 11, 2019

(54) COMPUTER SYSTEM FOR PERFORMING ADAPTIVE INTERRUPT CONTROL AND METHOD FOR CONTROLLING INTERRUPT THEREOF

(71) Applicant: Samsung Electronics Co., Ltd., Suwon-si, Gyeonggi-do (KR)

(72) Inventors: Kyung-San Kim, Seoul (KR); Kyung Ho Kim, Seoul (KR); Seokhwan Kim, Seoul (KR); Seunguk Shin, Seoul (KR); Jihyun Lim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/598,850

(22) Filed: May 18, 2017

(65) Prior Publication Data
US 2017/0336988 A1 Nov. 23, 2017

(30) Foreign Application Priority Data

May 19, 2016 (KR) .......... 10-2016-0061337

(51) Int. Cl.
*G06F 13/24* (2006.01)
*G06F 3/06* (2006.01)

(52) U.S. Cl.
CPC .......... *G06F 3/0611* (2013.01); *G06F 3/0659* (2013.01); *G06F 3/0685* (2013.01); *G06F 13/24* (2013.01)

(58) Field of Classification Search
CPC .......... G06F 3/061; G06F 13/24; G06F 21/85; G06F 3/0611; G06F 3/0659; G06F 3/0685
See application file for complete search history.

(56) References Cited

U.S. PATENT DOCUMENTS 6,772,260 B2  8/2004 Kawase et al.
6,792,483 B2 * 9/2004 Schmidt ............... G06F 3/0601
                                              710/260
(Continued)

FOREIGN PATENT DOCUMENTS

JP  H10-91394 A    4/1998
JP  2001-337838 A  12/2001
(Continued)

OTHER PUBLICATIONS

Jisoo Yang et al., "When Poll is Better than Interrupt", Intel Corporation, FAST'12 Proceedings of the 10th USENIX Conference on File and Storage Technologies, Feb. 2012.

*Primary Examiner* — Idriss N Alrobaye
*Assistant Examiner* — Richard B Franklin
(74) *Attorney, Agent, or Firm* — Harness, Dickey & Pierce, P.L.C.

(57) ABSTRACT

A computer system includes a host and a storage device. The host provides an input/output request (IO request). The storage device receives the request from the host and sends an interrupt informing input/output completion (IO completion) to the host after completing the IO request. The host adjusts the number of generated interrupts of the storage device using the number of delayed IOs. The computer system may adaptively control interrupt generation of the storage device based on a load status of a CPU or the number of delayed IOs. The interrupt generation of the storage device may be adjusted to obtain a CPU gain without loss of performance or processing time of the computer system.

13 Claims, 11 Drawing Sheets

(56) References Cited

U.S. PATENT DOCUMENTS

| | | | |
|---|---|---|---|
| 7,529,983 B2 | 5/2009 | Wagner | |
| 8,612,805 B2 * | 12/2013 | Teranishi | ............ G06F 11/3423 |
| | | | 714/25 |
| 9,298,652 B2 * | 3/2016 | Talpey | ................. G06F 13/385 |
| 2010/0057967 A1 | 3/2010 | Murakami et al. | |
| 2013/0318334 A1 | 11/2013 | Waskiewicz, Jr. | |
| 2014/0237150 A1 | 8/2014 | Kurihara et al. | |
| 2015/0212564 A1 | 7/2015 | Min et al. | |

FOREIGN PATENT DOCUMENTS

| | | |
|---|---|---|
| JP | 2003-015888 | 1/2003 |
| JP | 2005-277863 A | 10/2005 |
| JP | 2006-252015 A | 9/2006 |
| JP | 2008-262370 A | 10/2008 |

\* cited by examiner

| Pending IO | Definition | Value |
|---|---|---|
| Pending IO 1 | The number of SQ | m |
| Pending IO 2 | The number of CQ | n |
| Pending IO 3 | The sum of SQ and CQ | m+n |
| Pending IO 4 | The difference between SQ and CQ | \|m-n\| |

COMPUTER SYSTEM FOR PERFORMING ADAPTIVE INTERRUPT CONTROL AND METHOD FOR CONTROLLING INTERRUPT THEREOF

CROSS-REFERENCE TO RELATED APPLICATIONS

This U.S. non-provisional patent application claims priority under 35 USC § 119 to Korean Patent Application No. 10-2016-0061337, filed on May 19, 2016, the entirety of which is hereby incorporated by reference.

BACKGROUND

Example embodiments of inventive concepts relate generally to computer systems and/or methods of controlling same. For example, at least some example embodiments relate to a computer system for performing adaptive interrupt control and/or a method for controlling an interrupt thereof.

A computer system may include a host and a storage device. The host may be a computer mainframe or a server system. The storage device may be electrically connected to the host. The storage device may receive an input/output (IO) request from the host and process the received IO request. The storage device completes the IO request and may provide an interrupt to the host, thus informing the host of the IO completion.

A conventional storage device may have a relatively lower data processing speed than a data processing speed of the host. Accordingly, while the storage device processes an IO request, the host may execute another program to enhance perform of a system. When the host receives the interrupt, via the IO request from the storage device, while executing another program, the host may stop the program that is being executed and process the interrupt. After processing the interrupt, the host may recover the stopped program and execute the recovered program.

With the advance in semiconductor manufacturing technology, input/output processing speed of a storage device has improved to come close to the data processing speed of the host. As the data processing speed of the storage device is improved, the storage device may generate too many interrupts, thus degrading performance of the computer system.

SUMMARY

Example embodiments relate to a computer system and/or a method for controlling an interrupt of the computer system.

A computer system according to example embodiments of inventive concepts includes a host and a storage device. The storage device may be configured to receive an input/output (IO) request, and to send an interrupt informing input/output (IO) completion after completing the IO request; and the host may be configured to generate the IO request, and to adjust a number of generated interrupts of the storage device based on a number of delayed IOs.

A computer system according to example embodiments of inventive concepts includes a first storage device configured to receive a first input/output (IO) request, and to send an interrupt informing a first IO completion after completing the first IO request; a second storage device configured to receive a second IO request, and to send an interrupt informing a second IO completion after completing the second IO request; and a host including a first processor and a second processor, the host configured to, perform adaptive interrupt control of the first processor by adjusting a number of generated interrupts of the first storage device based on a number of delayed IOs between the host and the first storage device, and perform adaptive interrupt control of the second processor by adjusting a number of generated interrupts of the second storage device based on a number of delayed IOs between the host and the second storage device.

A method of controlling an interrupt of a storage device connected to a host according to example embodiments of inventive concepts includes receiving an input/output (IO) request from the host; adjusting a number of generated interrupts of the storage device based on a number of delayed IOs between the host and the storage device; completing the IO request received from the host; and sending an interrupt indicating an input/output (IO) completion to the host based on the adjusted number of the generated interrupts.

A host device according to example embodiments of the inventive concepts may include an interface configured to communicate with a storage device; and a processor configured to activate adaptive interrupt control (AIC) based on one or more of an idle ratio associated with the host device and a number of interrupts pending at the host device, the AIC instructing the storage device to reduce the number of interrupts transmitted to the host device.

BRIEF DESCRIPTION OF THE DRAWINGS

The forgoing and other features of example embodiments of the inventive concepts will be described below in more detail with reference to the accompanying drawings of non-limiting example embodiments of inventive concepts in which like reference characters refer to like parts throughout the different views. The drawings are not necessarily to scale, emphasis instead being placed upon illustrating principles of inventive concepts. In the drawings.

DETAILED DESCRIPTION

Figure 1:
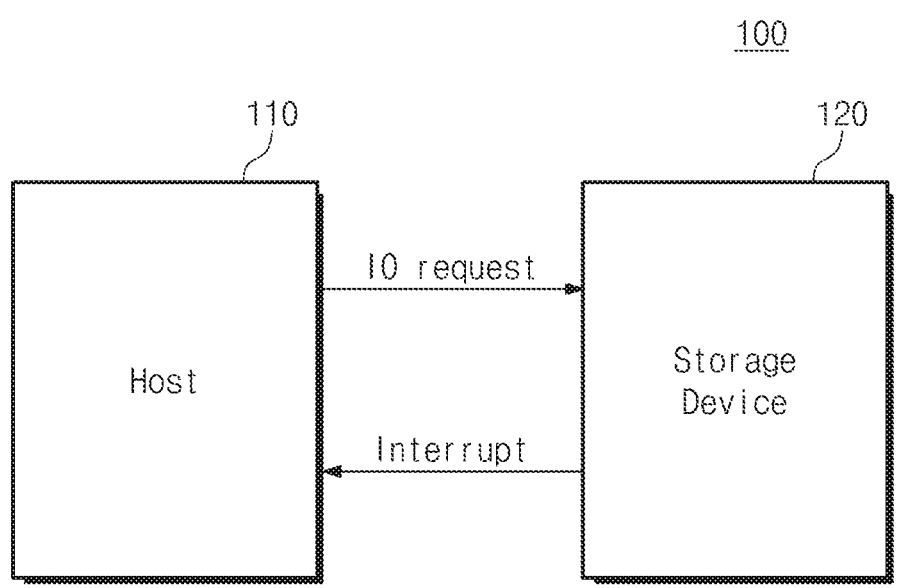
FIG. 1 is a block diagram of a computer system.

FIG. 1 is a block diagram of a computer system 100 according to example embodiments.

Referring to FIG. 1, as illustrated, the computer system 100 includes a host 110 and a storage device 120. The host 110 may be an electronic device such as a server computer, a desktop computer, a laptop computer, and/or a table personal computer (PC). The host 110 may be connected to peripheral devices (e.g., a keyboard, a mouse, a printer, a display, etc.) other than the storage device 120.

The host 110 may process data and may make a data input/output request to the storage device 120. Hereinafter, a series of operations for the host 110 to make the data input/output request to the storage device 120 will be simply referred to as "IO request".

The storage device 120 may be electrically connected to the host 110. The storage device 120 may be a storage medium based on a flash memory such as a solid state drive (SSD), a personal computer memory card international association (PCMCIA), a compact flash card (CF), a smart media card (SM or SMC), a memory stick, a multimedia card (MMC, RS-MMC or MMCmicro), an SD card (SD, miniSD, microSD or SDHC), a universal serial bus (USB) memory card, and/or a universal flash storage (UFS). The storage device 120 may be implemented using an embedded memory such as an embedded multimedia card (eMNIC), a UFS, and/or a perfect page new (PPN) memory.

Continuing to refer to FIG. 1, the host 110 may make a data input/output request (IO request) to the storage device 120. For example, the host 110 may provide a write request to write data into the storage device 120 or a read request to read data from the storage device 120. The storage device 120 may receive the IO request and may process the received IO request. The storage device 120 may complete the IO request and may generate an interrupt. The storage device 120 may inform the host 110 of IO completion through the interrupt.

Figure 2:
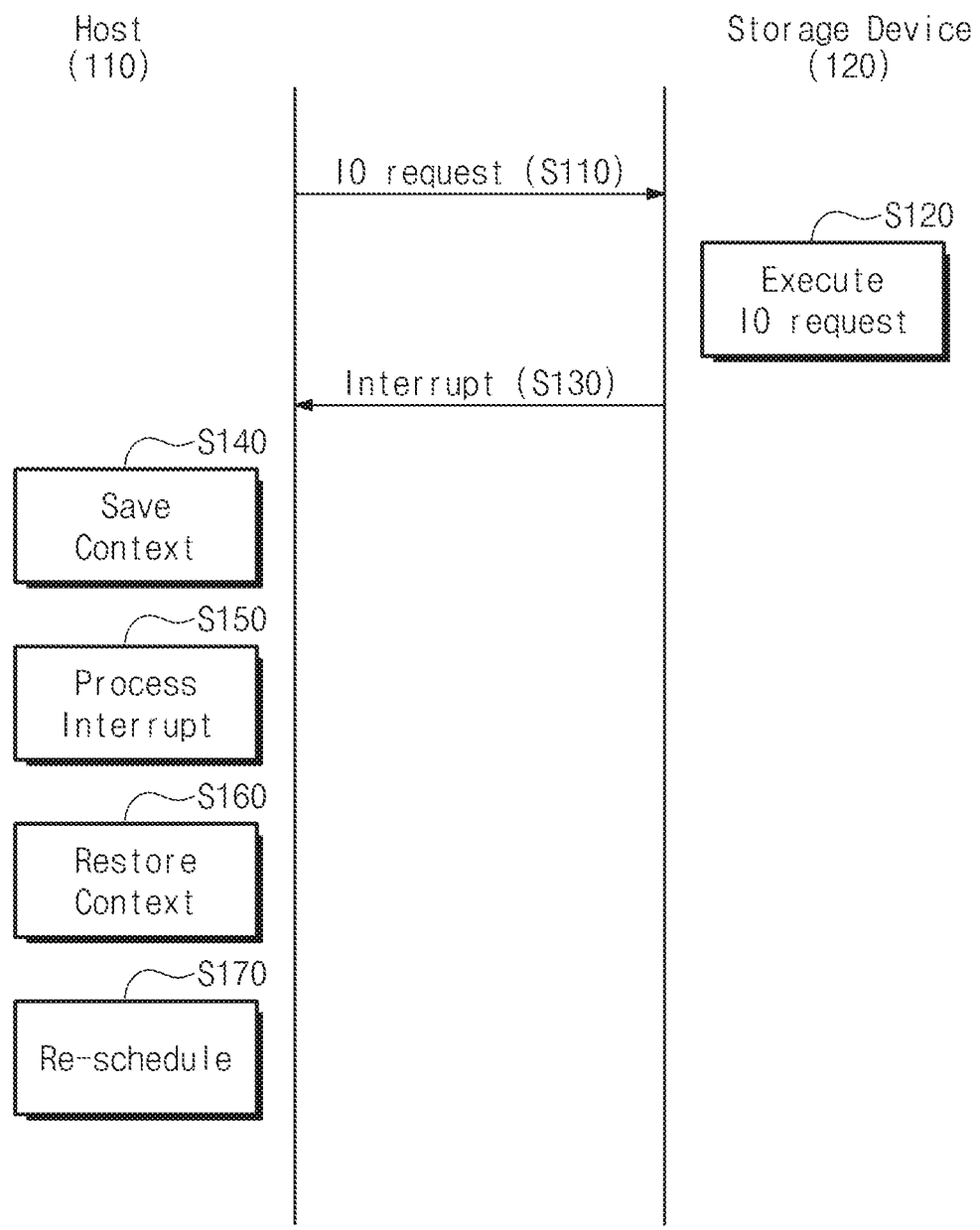
FIG. 2 is a flowchart summarizing operation of the computer system shown in FIG. 1.

FIG. 2 is a flowchart summarizing operation of the computer system 100 shown in FIG. 1.

Referring to FIG. 2, in operation S110, the host 110 may make an IO request to write data into the storage device 120 or to read data from the storage device 120. For example, when the host 110 wishes to store an image file in the storage device 120, the host 110 may make a write request to the storage device 120. When the host 110 wishes to read or, alternatively, to view) an image stored in the storage device 120, the host 110 may make a read request.

In operation S120, the storage device 120 may receive the IO request from the host 110 and may execute the IO request. The storage device 120 may include a first storage medium having high input/output processing speed and a second storage medium for retaining data for a long period of time. The first storage medium may be implemented using a random accessible volatile memory (e.g., DRAM) or a nonvolatile memory (e.g., PRAM or MRAM). The second storage medium may be implemented using a nonvolatile memory such as a flash memory. However, example embodiments are not limited thereto.

In the case of a write request, the storage device 120 may receive the write request and may store data in the first storage medium. The storage device 120 may internally move the data stored in the first storage medium to the second storage medium. The storage device 120 may perform the operation of moving the data to the second storage medium during an idle time or a background operation.

In operation S130, the storage device 120 may complete the IO request and may provide the interrupt to the host 110. For example, when the data received from the host 110 is stored in the first storage medium, the storage device 120 may generate IO completion. That is, even when the storage device 120 has not completed internally moving the data to the second storage medium, the storage device 120 may process the IO completion. The storage device 120 may provide an interrupt to the host 110 to inform the IO completion.

In operation S140, the host 110 receives the interrupt from the storage device 120 and saves a context that is being executed.

In operation S150, after saving the context that is being executed, the host 110 processes the interrupt.

In operation S160, after processing the interrupt, the host IO restores the saved context.

In operation S170, after restoring the context, the host 110 may readjust a schedule.

The IO processing speed of the storage device 120 may be lower than that of the host 110. While the storage device 120 processes the IO request, the host 110 waits until the storage device 120 processes the IO request. To lower the overhead, the host 110 may execute another context while the storage device 120 executes the IO request. When the host 110 receives the interrupt while executing the context, the host 110 saves the context that is being executed and processes the interrupt.

The computer system 100 shown in FIG. 1 may reduce the overhead of the host 110 when the IO processing speed of the storage device 120 is low. That is, the host 110 may execute another context using the interrupt while the storage device 120 executes the request.

Figure 3:
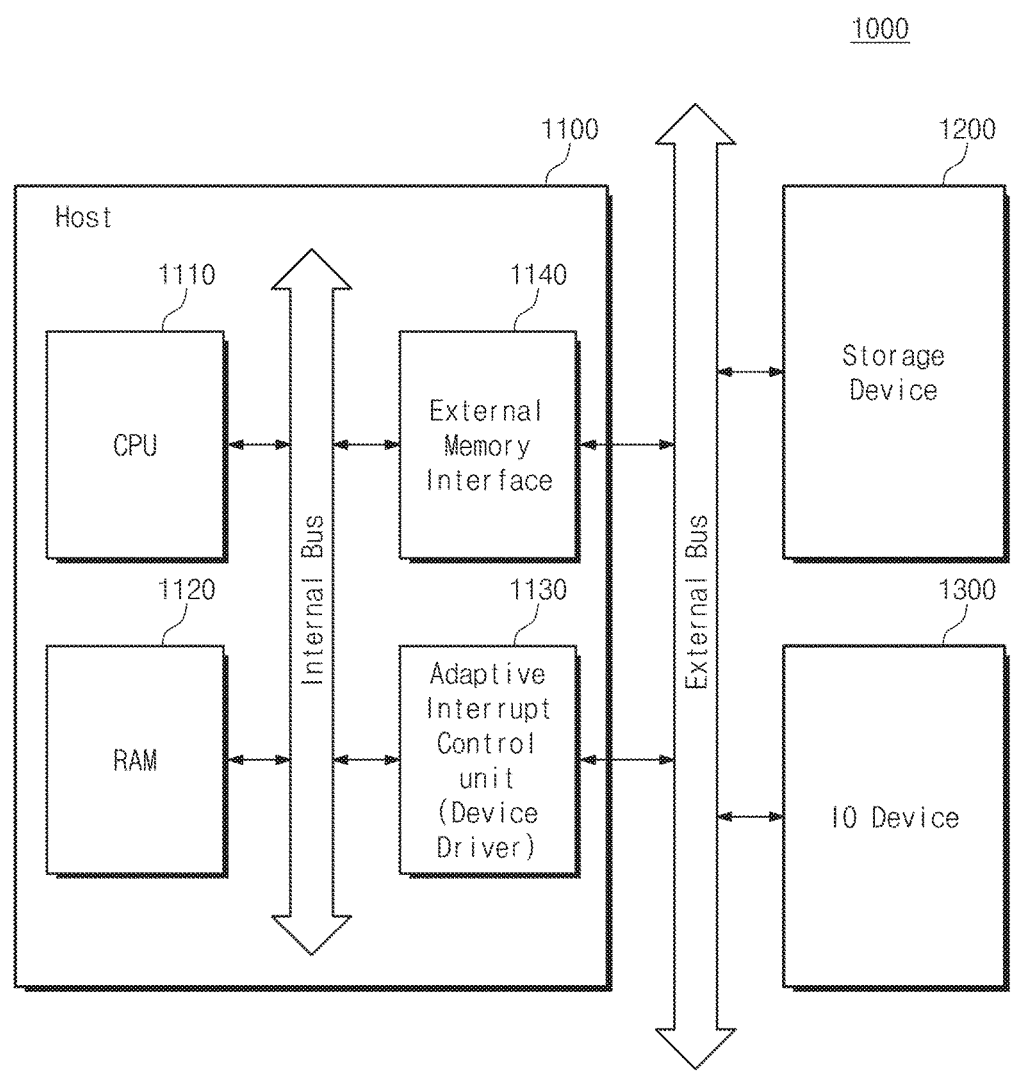
FIG. 3 is a block diagram of a computer system according to example embodiments of inventive concepts.

FIG. 3 is a block diagram of a computer system 1000 according to example embodiments of inventive concepts.

Referring to FIG. 3, as illustrated, the computer system 1000 includes a host 1100, a storage device 1200, and an input/output (IO) device 1300. The host 1100 may be connected to the storage device 1200 and the IO device 1300 through an external bus. The storage device 1200 may be a storage medium operating at high speed such as a solid state device (SSD). The IO device 1300 may be a device used to input or output data such as a keyboard, a mouse, a monitor, and a printer.

Still referring to FIG. 3, the host 1100 may include a central processing unit (CPU) 1110, a random access memory (RAM) 1120, an adaptive interrupt control (AIC) unit 1130, and an external memory interface 1140.

The CPU 1110 executes a program command of the host 1100. That is, the CPU 1110 may interpret the program command and may control the overall operation of the host 1100 according to the interpreted program command. Additionally, the CPU 1110 may perform not only arithmetic operations such as addition, subtraction, multiplication, and division but also logical operations such as AND, OR, NOT, and XOR.

Performance of the CPU 1110 may be measured based on the number of IO operations performed per second. Processing speed of the CPU 1110 may be expressed by Hertz (Hz) that is a unit of frequency. The greater a frequency value, the higher speed of the CPU 1110. In addition, the performance of the CPU 1110 may be evaluated based on the number of cores included in the CPU 1110. As a multi-core CPU emerges, the processing speed of the CPU 1110 may become much higher.

The RAM 1120 may be used to perform an arithmetic operation of the CPU 1110 or to drive an operating system (OS) or a device driver. The RAM 1120 may be used as a main memory device. The RAM 1120 may be implemented using a volatile memory such as DRAM or SRAM. In addition, the RAM 1120 may be implemented using a nonvolatile memory such as PRAM or MRAM.

The AIC unit 1130 may include a device driver to drive the storage device 1200. The device driver may be downloaded through Internet in the form of software or firmware or may be executed through a storage medium (e.g., CD or USB memory). Alternatively, the device driver may be loaded to the host 1100 from the storage device 1200 or a non-volatile memory associated with the host 1100 (not shown). The device driver may be executed by the CPU 1110, to configure the CPU 1110 to perform the operations of the AIC unit 1130.

The AIC unit 1130 may adjust interrupt generation of the storage device 1200. For example, the AIC unit 1130 may sense an IO load of the CPU 1110 to adjust interrupt generation. Additionally, the AIC unit 1130 may adjust interrupt generation through delay IO during an IO operation of the host 1100 and the storage device 1200. The configuration and operation principle of the AIC unit 1130 will be described below in detail.

The external memory interface 1140 may be connected to the storage device 1200 through an external bus. The external memory interface 1140 may have various interface schemes. For example, the external memory interface 1140 may exchange data with the storage device 1200 through a standard such as SATA, PATA, eMMC, UFS, USB, PCIe, and NVMe.

The storage device 1200 may be classified into a high-speed storage device and a low-speed storage device according to data IO speed. The data IO speed of the storage device 1200 may be decided according to type and interface of a storage medium. In general, the high-speed storage device may be based on a flash memory and the low-speed storage device may be based on a magnetic disk.

When the storage device 1200 inputs and outputs data at high speed, too many interrupts may be generated. When too many interrupts are generated, excess overhead may occur in the host 1100. For example, it will be assumed that the storage device 1200 has input/output speed of 1 mega IO per second (1 M IOPS). That is, the storage device 1200 may arithmetically generate one million interrupts per second. When one million interrupts are generated per second in the storage device 1200, the host 1100 performs a series of operations to stop a context that is being executed, process the interrupt, and recover the context, one million times.

As the storage device 1200 operates at high speed, an overhead caused by an interrupt is increasing. For this reason, in a Linux system, a specific CPU cycle is occupied for tens of seconds to process only an interrupt and thus a soft lockup bug occurs. Due to an interrupt that is too frequently generated in a high-speed storage device, performance of the computer system 1000 may be degraded.

The computer system 1000 may adaptively control interrupt generation of the storage device 1200 through the AIC unit 1130 based on a load status of a CPU and/or the number of delayed IOs. The interrupt generation of the storage device 1200 may be adjusted to secure a CPU gain without loss of the performance or processing time of the computer system 1000.

Figure 4:
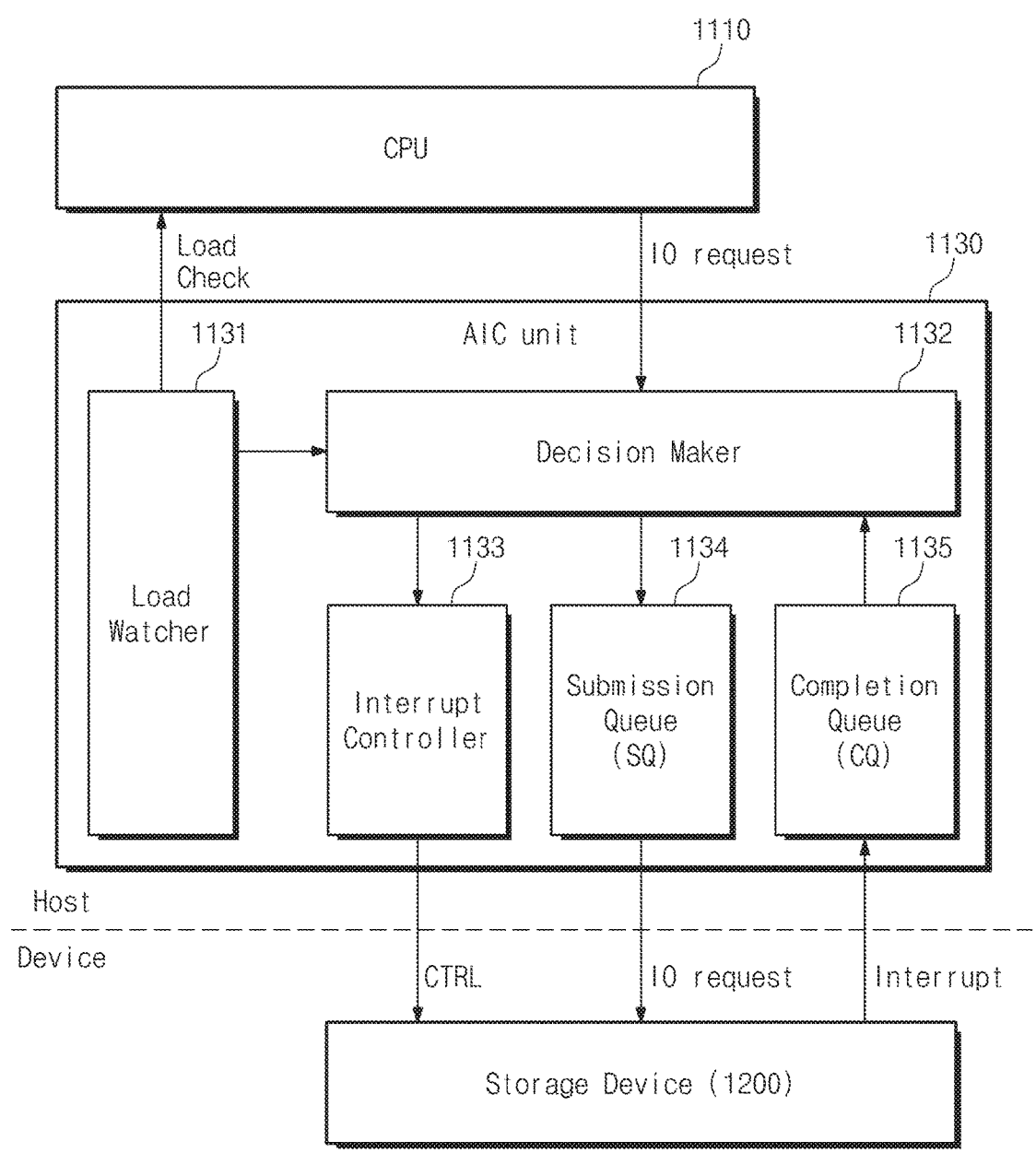
FIG. 4 is a block diagram of an AIC unit shown in FIG. 3.

FIG. 4 is a block diagram of the AIC unit 1130 shown in FIG. 3. As discussed above, in some example embodiments, the CPU 1110 may execute a software module such that the CPU 1110 performs the operations of the AIC unit 1130 to control the storage device 1200. In other example embodiments, the functions of the AIC unit 1130 may be performed by a dedicated circuit included in the host 1100. The storage device 1200 may be a high-speed storage device based on a flash memory. For example, the storage device 1200 may be an NVMe SSD.

Referring to FIG. 4, the AIC unit 1130 includes a load watcher 1131 decision maker 1132, and an interrupt controller 1133.

The AIC unit 1130 may watch an IO load of the CPU 1110 to adaptively control interrupt generation during an IO operation of the host 1100 and the storage device 1200. Thus, the computer system 1000 may reduce an interrupt processing load of the host 1100 and may improve a cycle gain of the CPU 1110. Moreover, the computer system 1000 may decrease the number of generated interrupts to prevent degradation in IO performance or delay of required processing time resulting from IO completion processing time delay.

The load watcher 1131 may periodically check a CPU load status. The load watcher 1131 may check the CPU load status after dividing the CPU load status into a user mode, a system mode, an IO pending mode, and an idle state mode. For example, the load watcher 1131 may activate adaptive interrupt control (AIC) using an idle ratio.

The load watcher 1131 may activate the AIC by comparing the idle ratio with a threshold. For example, the load watcher 1131 may activate the AIC when the idle ratio is lower than the threshold (e.g., 10 percent). In contrast, the load watcher 1131 may deactivate the AIC when the idle ratio is higher than the threshold (e.g., 10 percent).

The decision maker 1132 may control interrupt generation of the storage device 1200. When the host 1100 desires to control an interrupt of the storage device 1200, the decision maker 1132 may determine an interrupt control level (ICL). The decision maker 1132 may determine the ICL using delayed IO. The delayed IO may be obtained using submission IO in the host 1100 and completion IO in the storage device 1200.

The decision maker 11321 may calculate the number of delayed IOs based on the IO submitted in the host 1100 (hereinafter referred to as "IOsq") at a specific point of time and IO completed in the storage device 1200 (hereinafter referred to as "IOcq") at the specific point of time. In example embodiments, the number of delayed IOs may be calculated using one of the IOsq and the IOcq or a sum or a difference thereof. For example, the decision maker 1132 may calculate the number of delayed IOs using a difference between the IOsq and the IOcq. The delayed number means the number of IOs that are currently pending in the computer system 1000.

The decision maker 1132 may decide an interrupt control level ICL based on the number of delayed IOs. The decision maker 1132 may use a decision function for deciding the interrupt control level ICL. The decision function may be defined in various manners. For example, the decision function may be decided by dividing the number of delayed IOs in half. The decision function may decide the ICL by performing both an arithmetic operation and a modular operation. Alternatively, the decision function may decide the interrupt control level ICL by performing both an arithmetic operation and a modular operation on the number of delayed IOs.

When the decision maker 1132 changes the interrupt control level ICL too often, IO performance between the host 1100 and the storage device 1200 may be degraded. To prevent the degradation in IO performance, the interrupt control level ICL may be adjusted to a fixed window size using the modular operation. To achieve this, a desired (or, alternatively, a predetermined) protocol is used between the host 1100 and the storage device 1200 to perform adaptive interrupt control AIC. For example, an NVMe may set up a protocol through Interrupt Coalescing/Interrupt Vector Configuration Admin Command (Set/Get Feature 0x8, 0x9).

The decision maker 1132 may decide an interrupt control level ICL to reduce interrupt generation of the storage device 1200. For example, assuming that the interrupt control level ICL is 24, the storage device 1200 may omit interrupt generation of 23 times and may generate an interrupt only once. Accordingly, the decision maker 1132 may reduce interrupt generation and prevent interrupt processing time delay.

The interrupt controller 1133 may receive the interrupt control level ICL from the decision maker 1132 and may provide an interrupt control command CTRL to the storage device 1200. The interrupt controller 1133 may increase or decrease the number of generated interrupts of the storage device 1200.

Still referring to FIG. 4, the AIC unit 1130 may include a submission queue (SQ) 1134 and a completion queue (CQ) 1135. In some example embodiments, the submission queue 1134 may be included in the AIC unit 1130. The submission queue 1134 and the completion queue 1135 may be driven by the RAM 1120 (see FIG. 3) of the host 1100.

The submission queue 1134 may store IO requests provided form the CPU 1110 and may sequentially provide the stored IO requests to the storage device 1200. The submission queue 1134 may store the IO request in the RAM 1120 (see FIG. 3). On the other hand, the completion queue 1135 may sequentially store IO requests completed in the storage device 1200. The completion queue 1135 may receive an interrupt IO completion from the storage device 1200 and may store the completed IO request. The completion queue 1135 may store the IO completion in the RAM 1120. The storage device 1200 may receive the interrupt control command CTRL and may generate an interrupt according to the interrupt control level ICL.

Figure 5:
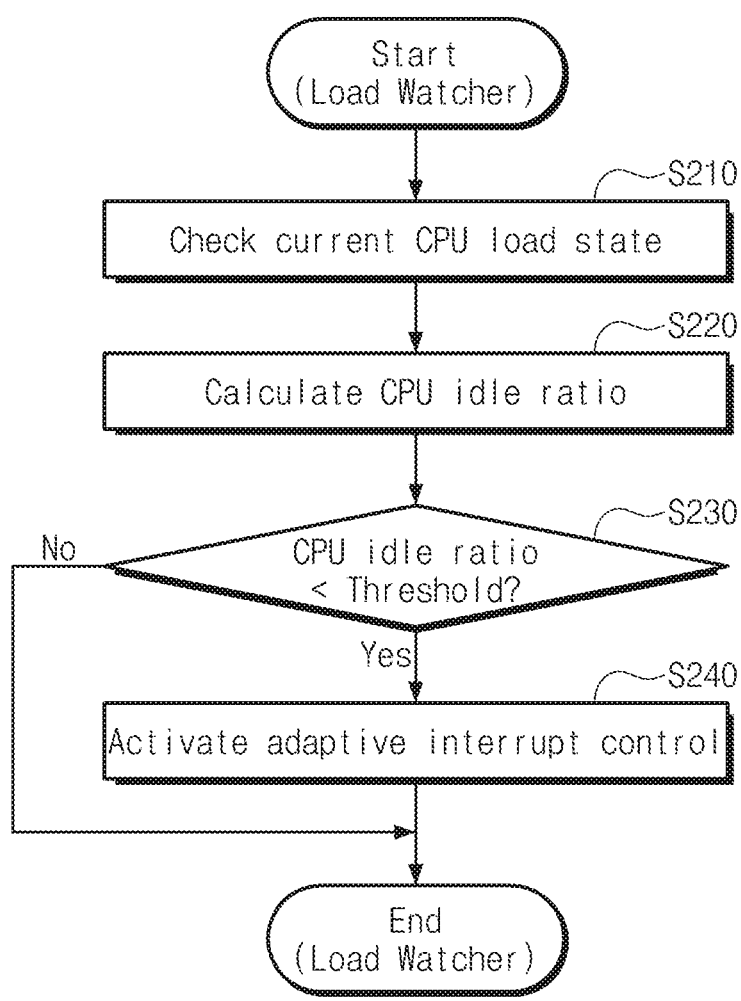
FIG. 5 is a flowchart summarizing operation of a load watcher shown in FIG. 4.

FIG. 5 is a flowchart summarizing operation of the load watcher 1131 shown in FIG. 4.

Referring to FIG. 5, as discussed above, in some example embodiments, the CPU 1110 may execute a software module such that the CPU 1110 performs the operations of the AIC unit 1130 including the load watcher 1131. In other example embodiments, the functions of the AIC unit 1130 may be performed by a dedicated circuit included in the host 1100.

In operation S210, the load watcher 1131 checks a load status of a current CPU 1110. The load watcher 1131 may receive IO information and may periodically check the load status.

In operation S220, the load watcher 1131 may calculate an idle ratio of the CPU 1110. A load status of the CPU 1110 may be divided into a user mode, a system mode, an IO pending mode, and an idle state mode. An idle ratio of a CPU means a ratio of an idle state to the entire load status of the CPU. The AIC unit 1130 may activate adaptive interrupt control (AIC) based on the idle ratio.

In operation S230, the load watcher 1131 compares the idle ratio with a threshold. For example, the load watcher 1131 may determine whether the idle ratio is lower than the threshold. When the idle ratio is higher than or equal to the threshold (No), the load watcher 1131 may not perform the AIC. If the adaptive interrupt control is being performed, the load watcher 1131 may deactivate the adaptive interrupt control. Meanwhile, when the idle ratio is lower than the threshold (Yes), the load watcher 1131 proceeds to operation S240.

In operation S240, the load watcher 1131 may activate the AIC when the idle ratio is lower than the threshold. For example, the load watcher 1131 may activate the AIC when the idle ratio is lower than the threshold by 10 percent. The load watcher 1131 may provide a signal for activating the AIC to the decision maker 1132.

Figure 6:
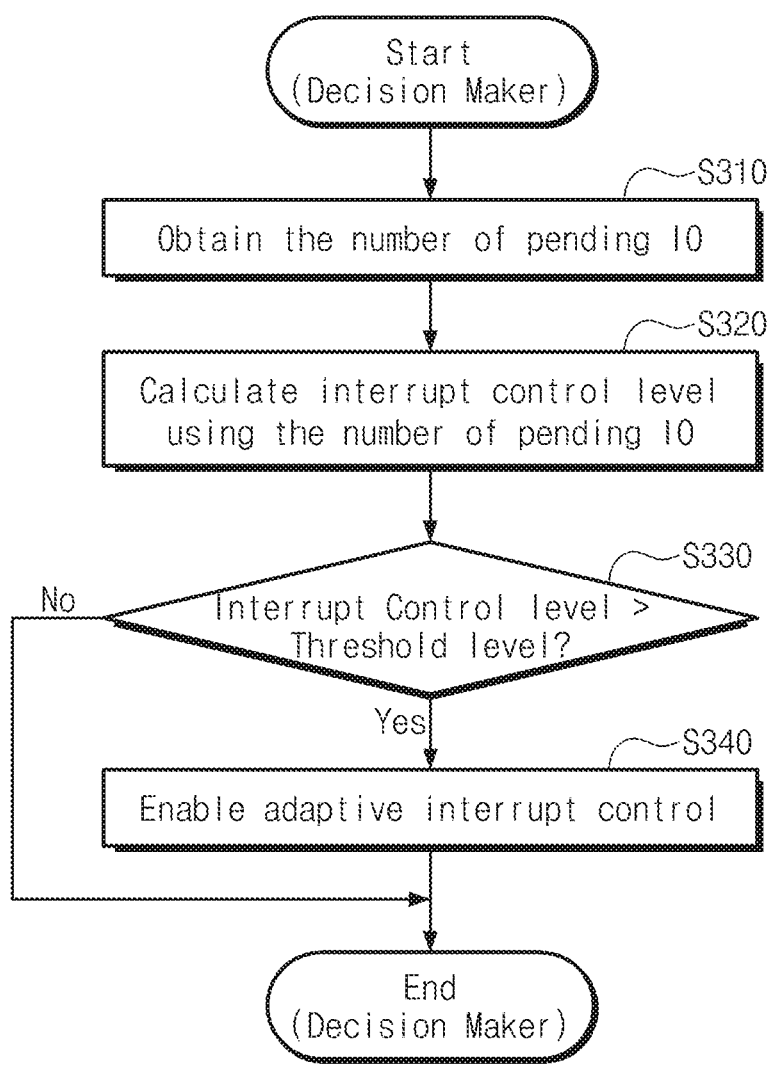
FIG. 6 is a flowchart summarizing operation of a decision maker shown in FIG. 4.

FIG. 6 is a flowchart summarizing operation of the decision maker 1132 shown in FIG. 4.

Referring to FIG. 6, as discussed above, in some example embodiments, the CPU 1110 may execute a software module such that the CPU 1110 performs the operations of the AIC unit 1130 including the decision maker 1132. In other example embodiments, the functions of the AIC unit 1130 may be performed by a dedicated circuit included in the host 1100.

In operation S310, the decision maker 1132 may obtain the number of pending delayed IOs. The decision maker 1132 may calculate the number of the delayed IOs using a submission IO IOsq and a completion IO IOcq. For example, the decision maker 1132 may calculate the number of the delayed IOs using a difference between the IOsq and the IOcq. The number of the delayed IOs means the number of IOs that waits for processing in the computer system 1000.

In operation S320, the decision maker 1132 calculates an interrupt control level ICL based on the number of the delayed IOs. The interrupt control level ICL may be obtained by a desired (or, alternatively, a predetermined) decision function. For example, it will be assumed that the decision function is half the number of the delayed IOs. When the IOsq is 100 and IOcq is 10, the number of the delayed IOs is 90 that is a difference between the IOsq and the IOcq. Accordingly, the interrupt control level ICL is calculated as 45 by the decision function. When the interrupt control level ICL is 45, the storage device 1200 omits interrupt generation of 44 times and generates an interrupt once.

In operation S330, the decision maker 1132 compares the interrupt control level ICL with a threshold level. The decision maker 1132 may perform operation S330 when a modular operation is applied in operation S320. The decision maker 1132 may adjust the ICL to a fixed window size using the modular operation. The decision maker 1132 determines whether the ICL is higher than the threshold level. When the ICL is lower than or equal to the threshold level (No), the decision maker 1132 may not perform the adaptive interrupt control (AIC). In contrast, when the ICL is higher than the threshold level (Yes), the decision maker 1132 proceeds to operation S340.

In operation S340, the decision maker 1132 may enable the adaptive interrupt control (AIC). For example, the decision maker 1132 may provide an interrupt control command CTRL to the storage device 1200 when the interrupt control level ICL is higher than the threshold level.

Figure 7:
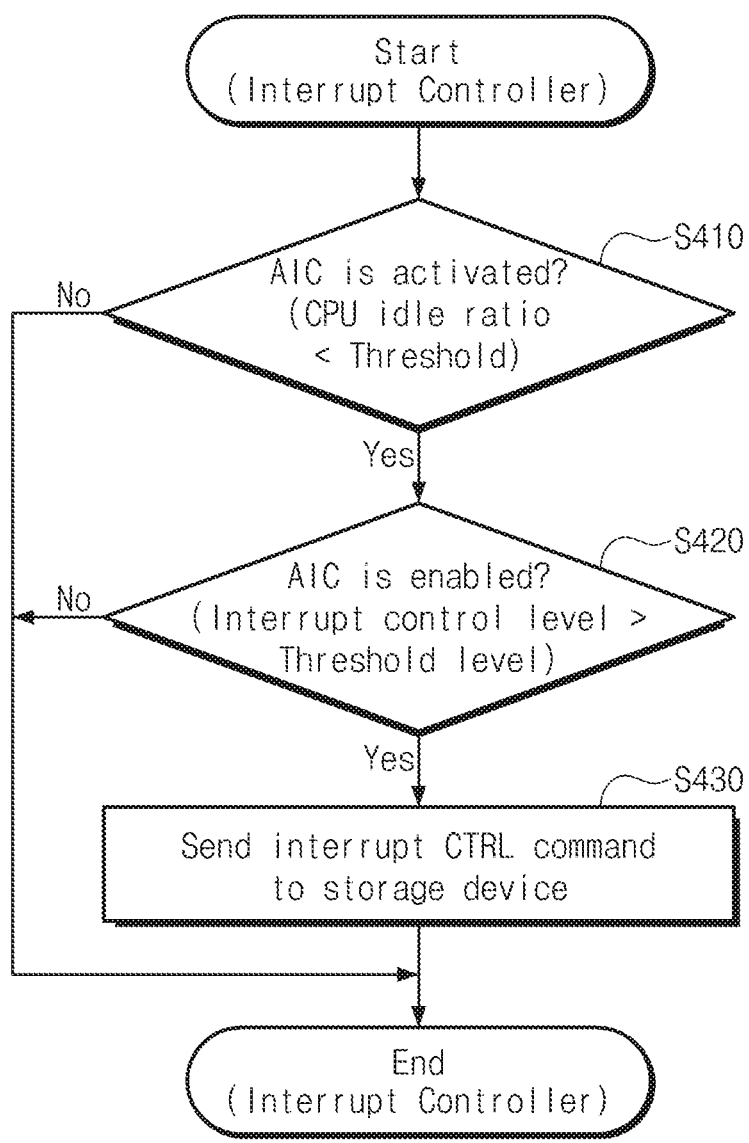
FIGS. 7 and 8 are flowcharts summarizing operations of an interrupt controller shown in FIG. 4, respectively.
Figure 8:
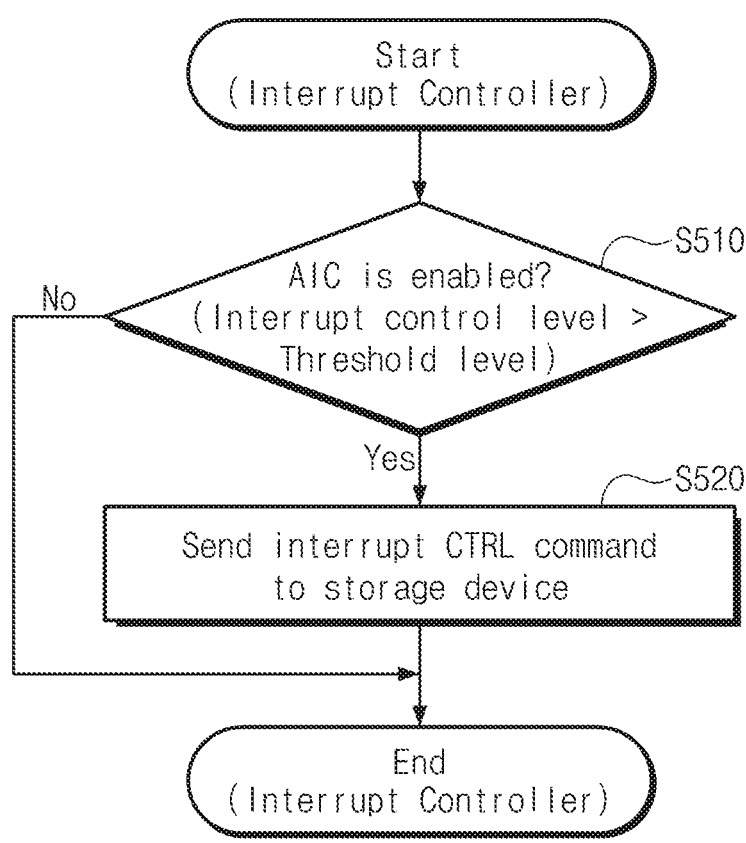

FIGS. 7 and 8 are flowcharts summarizing operations of the interrupt controller 1133 shown in FIG. 4. FIG. 7 illustrates an example in which the interrupt controller 1133 performs adaptive interrupt control (AIC) based on a load status of a CPU and the number of pending IOs, and FIG. 8 illustrates an example in which the interrupt controller 1133 performs AIC based on the number of pending ICs.

Referring to FIG. 7, as discussed above, in some example embodiments, the CPU 1110 may execute a software module such that the CPU 1110 performs the operations of the AIC unit 1130 including the interrupt controller 1133. In other example embodiments, the functions of the AIC unit 1130 may be performed by a dedicated circuit included in the host 1100.

in operation S410, the interrupt controller 1133 determines whether the AIC is activated. As described in operation S230 of FIG. 5, activation of the AIC may be determined depending on whether a CPU idle ratio is higher than a threshold. When the AIC is not activated, the interrupt controller 1133 may not provide an interrupt control command CTRL to the storage device 1200. Meanwhile, when the AIC is activated, the flow proceeds to S420.

In operation S420, the interrupt controller 1133 may determine whether the AIC is enabled. As described in operation S330 of FIG. 6, enablement of the AIC may be determined depending on whether the interrupt control level (ICL) is higher than a threshold. When the AIC is enabled, the flow proceeds to operation S430.

In operation S430, the interrupt controller 1133 sends the interrupt control command CTRL to the storage device 1200. The interrupt controller 1133 may provide the interrupt control command CTRL, to the storage device 1200 to adjust the number of generated interrupts.

According to the operation method of the interrupt controller 133 shown in FIG. 7, interrupt generation of the storage device 1200 may be adaptively controlled based on a load status of a CPU and the number of delayed IOs. The interrupt generation of the storage device 1200 may be adjusted to secure a CPU gain without loss of performance or processing time of the computer system 1000.

Referring to FIG. 8, in operation S510, the interrupt controller 1133 determines whether the AIC is enabled. The determination may be made by comparing an interrupt control level ICL with a threshold level. When the AIC is not enabled, the interrupt controller 1133 may not provide the interrupt control command CTRL to the storage device 1200.

In operation S520, when the AIC is enabled, the interrupt controller 1133 sends the interrupt control command CTRL to the storage device 1200. The interrupt controller 1133 may provide the interrupt control command CTRL to the storage device 1200 to adjust the number of generated interrupts.

Figures 9, 10:
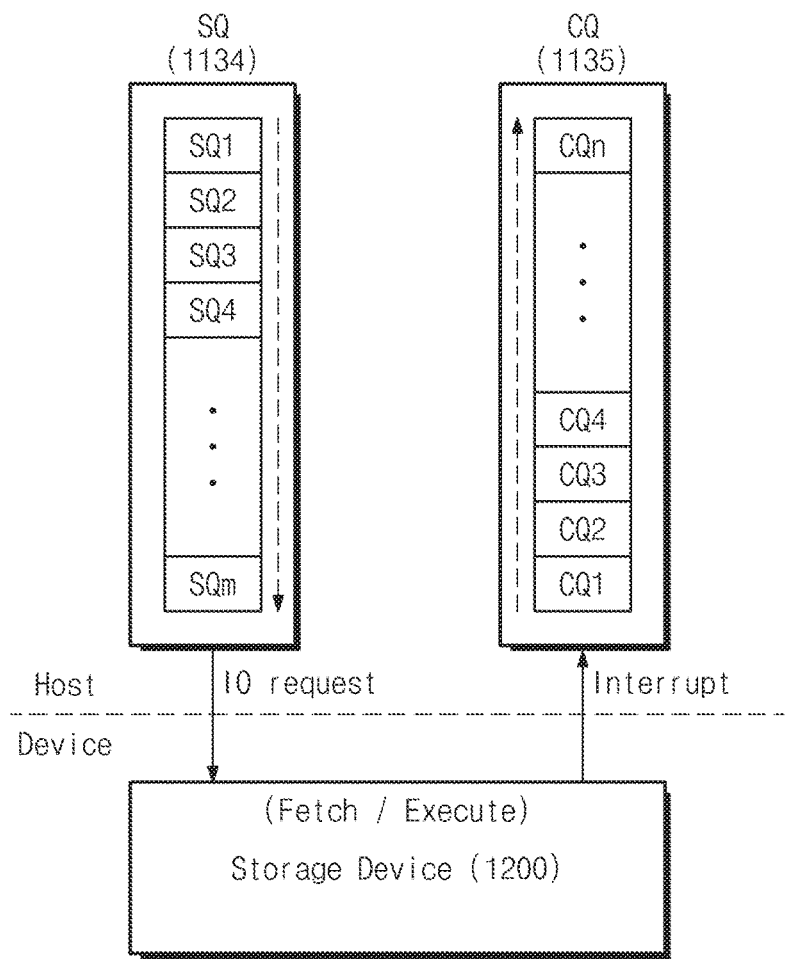
FIG. 9 is a conceptual diagram illustrating operations of a submission queue and a completion queue shown in FIG. 4.
FIG. 10 is a table defining a delay IO shown in FIG. 9.

FIG. 9 is a conceptual diagram illustrating operations of the submission queue and the completion queue shown in FIG. 4.

Referring to FIG. 9, the submission queue (SQ) 1134 includes first to $m^{th}$ submission queues SQ1 to SQm. An IO request received from the CPU 1110 is stored in the first to $m^{th}$ submission queues SQ1 to SQm. The completion queue (CQ) 1135 includes first to $n^{th}$ completion queues CQ1 to CQn. Completion information received from the storage device 1200 is stored in the first to $n^{th}$ completion queues CQ1 to CQn. The number of delayed IOs may be obtained through the submission queue (SQ) 1134 and the completion queue (CQ) 1135.

The decision maker 1132 may decide an interrupt control level ICL based on the number of the delayed IOs. Equation (1) shows the procedure of deciding the interrupt control level ICL using the number of delayed IOs. It will be assumed that a submission queue IOsq is 100 (m=100) and a completion queue IOcq is (n=10).

$$P1=IOsq-IOcq \qquad \text{Equation (1)}$$

The decision maker 1132 may utilize Equation (1) to calculate the number of delayed IOs (P1) using a difference between a submission queue SQ and a completion queue CQ (IOsq−IOcq). In the Equation (1), the number of the delayed IOs is 90.

$$P2=P1/2 \qquad \text{Equation (2)}$$

The decision maker 1132 may utilize Equation (2) as a decision function for obtaining an interrupt control level ICL. According to the Equation (2), a decision function (P2) is 90/2. That is, the interrupt control level ICL is 45. When the interrupt control level ICL is 45, the storage device 1200 omits interrupt generation of 45 times and may generate an interrupt only once.

$$P3=P2\%(\text{windowsize}) \qquad \text{Equation (3)}$$

The decision maker 1132 may utilize Equation (3) as a decision function for obtaining an interrupt control level ICL using a modular operation. It will be assumed that a window size is 24. The decision maker 1132 performs a modular operation on the P2 obtained in the Equation (2) to calculate the interrupt control level ICL. The decision maker 1132 may reduce interrupt generation of the storage device 1200 through the interrupt control level ICL.

The storage device 1200 may receive the interrupt control command CTRL to adjust interrupt generation. The storage device 1200 fetches an IO request from the submission queue (SQ) 1134 and executes the IO request. After completing the IO request, the storage device 1200 sends an interrupt to the completion queue (CQ) 1135 according to the interrupt control command CTRL.

FIG. 10 is a table defining a delay IO shown in FIG. 9.

Referring to FIG. 10, the delayed IO may be defined in various manners. A first delayed IO may be defined using the number of submission queues SQ. In the example of FIG. 9, the first delayed IO may be m. A second delayed IO may be defined using the number of completion queues CQ. In the example of FIG. 9, the second delayed IO may be n. A third delayed IO may be defined using the sum of the submission queue SQ and the completion queue CQ (IOsq+IOcq). In the example of FIG. 9, the third delayed IO may be m+n. A third delayed IO may be defined using a difference between the completion queue SQ and the completion queue CQ (IOsq−IOcq). In the example of FIG. 9, the fourth delayed IO may be m−n (m>n).

Figure 11:
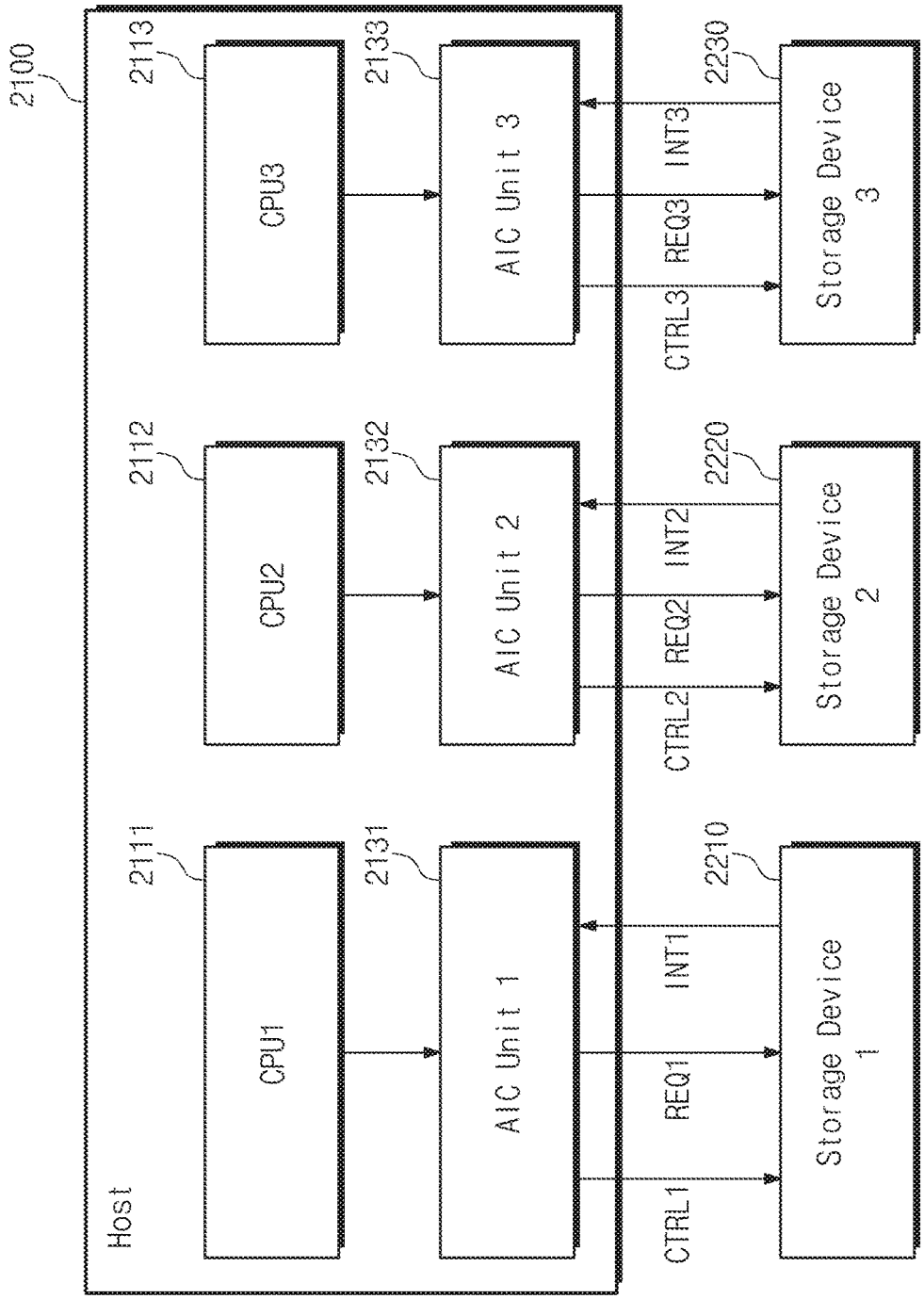
FIG. 11 is a block diagram of a computer system according to example embodiments of inventive concepts.

FIG. 11 is a block diagram of a computer system 2000 according to example embodiments of inventive concepts.

Referring to FIG. 11, as illustrated, the computer system 2000 may include a host 2100 and a plurality of storage devices 2210 to 2230. The host 1100 may include a plurality of central processing units (CPUs) 2111 to 2113 and a plurality of adaptive interrupt control units 2131 to 2133.

A first AIC unit 2131 may detect a load status of the first CPU 2111. The first AIC unit 2131 may decide an interrupt control level ICL based on the number of delayed IOs of the host 2100 and the first storage device 2210. The first AIC unit 2131 may send a first interrupt control command CTRL1 to the first storage device 2210. The first storage device 2210 may adjust the number of generated interrupts according to the first interrupt control command CTRL1. The first storage device 2210 may receive a first IO request REQ1 from the first AIC unit 2131. After completing the first IO request REQ1, the first storage device 2210 may send a first interrupt INT1 to the first AIC unit 2131 according to the first interrupt control command CTRL1.

Similarly, the second AIC unit 2132 may send a second interrupt control command CTRL2 to the second storage device 2220. After completing a second IO request REQ2, the second storage device 2220 may send a second interrupt INT2 to the second AIC unit 2132 according to the second interrupt control command CTRL2. After completing a third IO request REQ3, the third storage device 2230 may send a third interrupt INT3 to the third AIC unit 2133 according to the third interrupt control command CTRL3.

The computer system 2000 may perform adaptive interrupt control (AIC) even when the host 2100 includes a plurality of CPUs. The computer system 2000 may efficiently decrease the number of generated interrupts through the adaptive interrupt control (AIC).

Figure 12:
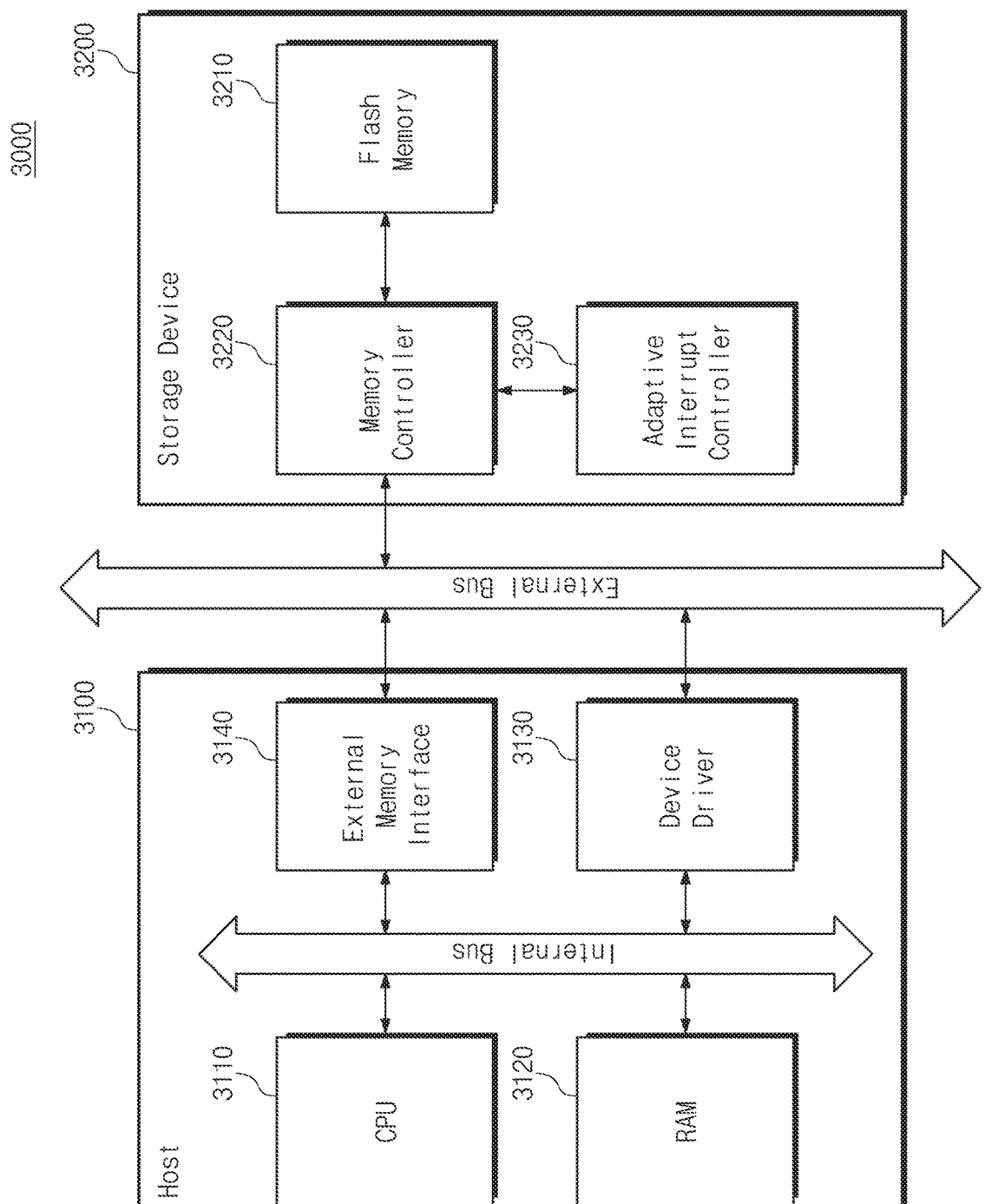
FIG. 12 is a block diagram of a computer system according to example embodiments of inventive concepts.

FIG. 12 is a block diagram of a computer system 3000 according to example embodiments of inventive concepts.

Referring to FIG. 13, as illustrated, the computer system 3000 includes a host 3100 and a storage device 3200. The host 3100 includes a central processing unit (CPU) 3110, a random access memory (RAM) 3120, a device driver 3130, and an external memory interface 3140.

The CPU 3110 may control the overall operation of the host 3100. The RAM 3120 may be used to drive an operating system (OS) or the device driver 3130. The device driver 3130 may be software to drive the storage device 3200. The external memory interface 3140 may be connected to the storage device 3200 through an external bus.

The storage device 3200 includes a flash memory 3210, a memory controller 3220, and an adaptive interrupt controller 3230.

The storage device 3200 may be a high-speed storage device based on the flash memory 3210. When the storage device 3200 performs an IO operation at high speed, an overhead may occur in the host 3100 due to too many interrupts.

In some example embodiments, the memory controller 3220 may execute a software module such that the memory controller 3220 performs the operations of the AIC controller 3230. In other example embodiments, the AIC controller 3230 may be a dedicated processor and/or circuit designed to perform the same.

The adaptive interrupt controller 3230 may adjust interrupt generation of the storage device 3200. The adaptive interrupt controller 3230 may adjust interrupt generation through the number of delayed IOs during an IO operation of the host 3100 and the storage device 3200. The adaptive interrupt controller 3230 may include the decision maker 1132 and the interrupt controller 1133 shown in FIG. 4.

The adaptive interrupt controller 3230 may calculate the number of delayed IOs using a submission IO IOsq and a completion IO IOcq. The adaptive interrupt controller 3230 may calculate an interrupt control level ICL using the number of delayed IOs. The storage device 3200 may adaptively control interrupt generation using the interrupt control level ICL. The computer system 3000 shown in FIG. 12 includes an adaptive interrupt controller 3230 in the storage device 3200. The computer system 3000 may adaptively adjust the interrupt generation using the adaptive interrupt controller 3230 to secure a CPU gain without loss of performance or processing time of the computer system 3000.

The computer system 3000 shown in FIG. 12 may include a load watcher 1131 (see FIG. 4) in the device driver 3130 of the host 3100. The device driver 3130 may periodically check a CPU load status. The device driver 3130 may activate adaptive interrupt control (AIC) using an idle ratio of the CPU.

The computer system 3000 may include an adaptive interrupt controller 3230 in the storage device 3200. In addition, the computer system 3000 may include a load watcher in the device driver 3130. The computer system 3000 may adaptively control interrupt generation of the storage device 3200 based on a load status of the CPU or the number of delayed IOs. The interrupt generation of the storage device 3200 may be adjusted to secure a CPU gain without loss of performance or processing time of the computer system 3000.

As described above, a computer system according to example embodiments of inventive concepts may control interrupt generation of a storage device based on a load status of a CPU or the number of delayed IOs. The interrupt generation of the storage device may be efficiently adjusted to enhance performance of the computer system.

The above-disclosed subject matter is to be considered illustrative, and not restrictive, and the appended claims are intended to cover all such modifications, enhancements, and other features, which all within the true spirit and scope of inventive concepts. Thus, to the maximum extent allowed by law, the scope of inventive concepts is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A computer system comprising:
   a storage device configured to receive an input/output (IO) request, and to send an interrupt after completing the IO request, the interrupt indicating that an IO associated with the IO request is an IO completion; and
   a host configured to,
      generate the IO request,
      tally a number of the IO request sent by the host, and a number of the IO completion by the storage device,
      determine a number of delayed IOs based on the number of the IO request and the number of the IO completion,
      calculate an interrupt control level based on the number of delayed IOs, and
      selectively adjust a frequency of the interrupt from the storage device in response to the interrupt control level being greater than a threshold, wherein
      the host is configured to selectively transmit an interrupt control command to the storage device in response to the host determining that the interrupt control level is greater than the threshold, and
      the storage device is configured to adjust the frequency of the interrupt based on the interrupt control command.

2. The computer system as set forth in claim 1, wherein the host comprises:
   a memory including,
      a submission queue configured to store the number of the IO request generated by the host, and
      a completion queue configured to store the number of the IO completion completed by the storage device.

3. The computer system as set forth in claim 2, wherein the host is configured to calculate the number of the delayed IOs as a sum of the number of IO requests stored in the submission queue and the number of IO completions stored in the completion queue.

4. The computer system as set forth in claim 2, wherein the host is configured to calculate the number of the delayed IOs as a difference between the number of IO requests stored in the submission queue and the number of IO completions stored in the completion queue.

5. The computer system as set forth in claim 1, wherein the host is configured to,
   monitor a load status of a central processing unit, and
   selective adjust the frequency of the interrupt from the storage device based on the load status and the number of the delayed IOs.

6. The computer system as set forth in claim 5, wherein the host is configured to activate an adaptive interrupt control of the storage device based on an idle ratio of the central processing unit and a threshold.

7. The computer system as set forth in claim 5, wherein the host is configured to adjust the frequency of the interrupt by,
selectively sending the interrupt control command to the storage device based on the interrupt control level.

8. The computer system as set forth in claim 7, wherein the host is configured to determine a load status of the central processing unit.

9. The computer system as set forth in claim 8, wherein the host is configured to execute a device driver to drive the storage device.

10. A computer system comprising:
a first storage device configured to receive a first input/output (IO) request, and to send a first interrupt after completing the first IO request, the first interrupt indicating that a first IO associated with the first IO request is a first IO completion;
a second storage device configured to receive a second IO request, and to send a second interrupt after completing the second IO request, the second interrupt indicating that a second IO associated with the second IO request is a second IO completion; and
a host including a first processor and a second processor, the host configured to,
perform adaptive interrupt control of the first processor by,
tallying a number of the first IO request sent by the host, and a number of the first IO completion by the first storage device,
determining a number of delayed first IOs based on the number of the first IO request and the number of the first IO completion,
calculating a first interrupt control level based on the number of delayed first IOs, and
selectively adjusting a frequency of the first interrupt from the first storage device in response to the first interrupt control level being greater than a first threshold, and
perform adaptive interrupt control of the second processor by,
tallying a number of the second IO request sent by the host, and a number of the second IO completion by the second storage device,
determining a number of delayed second IOs based on the number of the second IO request and the number of the second IO completion,
calculating a second interrupt control level based on the number of delayed second IOs, and
selectively adjusting a frequency of the second interrupt of the second storage device in response to the second interrupt control level being greater than a second threshold, wherein
each of the first processor and the second processor is configured to selectively send an interrupt control command to the first and second storage devices based on the first interrupt control level and the second interrupt control level respectively.

11. The computer system as set forth in claim 10, wherein the host is further configured to monitor a load status of the first processor and the second processor.

12. The computer system as set forth in claim 11, wherein the host is configured to,
activate the adaptive interrupt control of the first storage device based on an idle state of the first processor and the first threshold, and
activate the adaptive interrupt control of the second storage device based on an idle state of the second processor and the second threshold.

13. A host device comprising:
an interface configured to communicate with a storage device; and
a processor configured to selectively activate adaptive interrupt control (AIC) based on one or more of an idle ratio associated with the host device and a number of delayed interrupts (IOs), the processor configured to selectively activate the AIC by,
tallying a number of IO requests sent by the host device, and a number of IOs completed by the storage device,
determining the number of delayed IOs based on the number of IO requests and the number of IOs completed,
calculating an interrupt control level (ICL) based on at least the number of delayed IOs, and
selectively instructing the storage device to perform the AIC, if the ICL is greater than a threshold, the interrupt control command instructing the storage device to reduce a number of interrupts transmitted to the host device, wherein the processor is configured to,
determine an idle ratio associated with the host device based on a load status of the processor, and
calculate the ICL based on the idle ratio and the number of delayed IOs.

* * * * *